Dec. 5, 1961 R. S. HINSEY 3,011,361
MECHANISM CONTROL
Filed Dec. 16, 1957 2 Sheets-Sheet 1
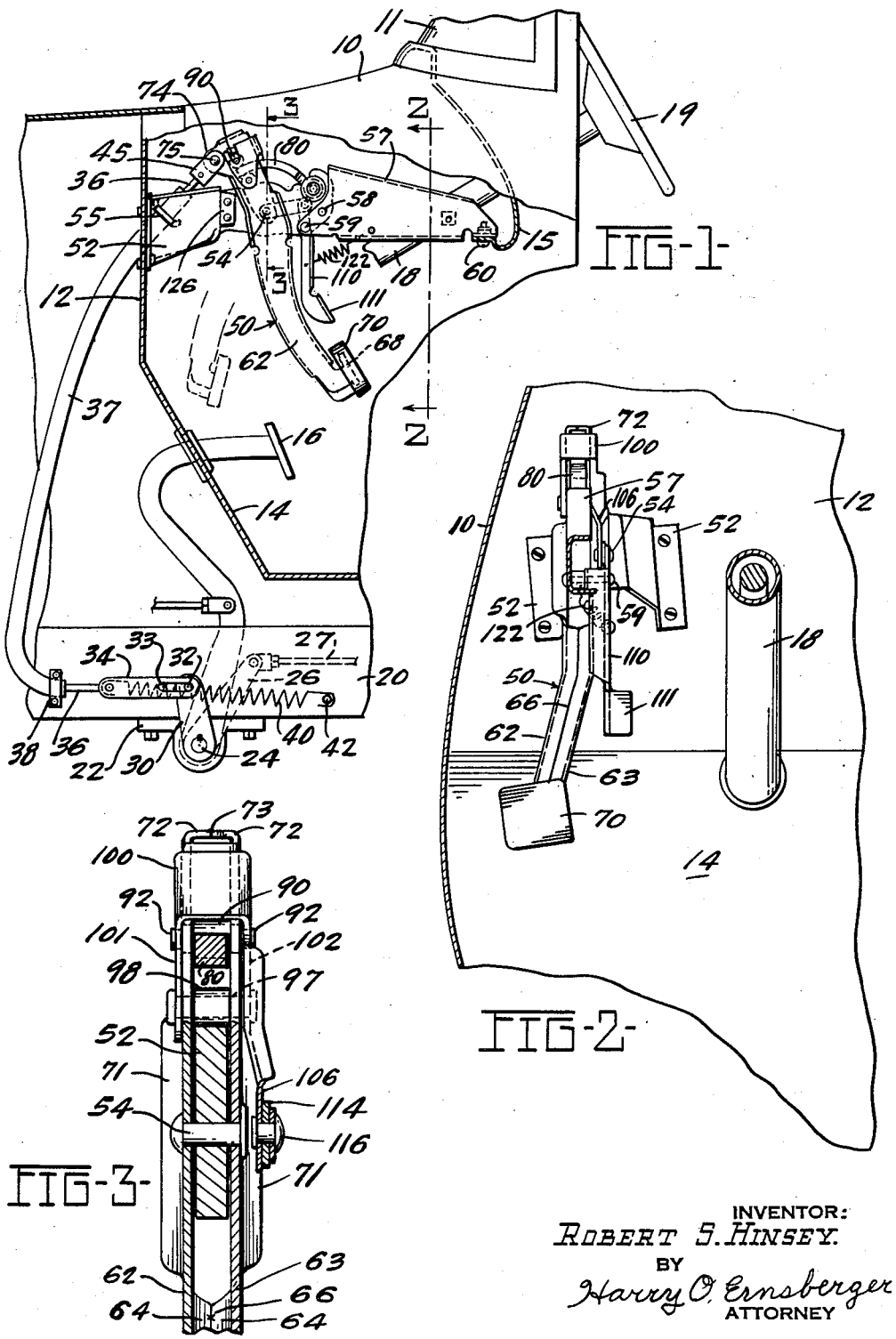
INVENTOR:
ROBERT S. HINSEY.
BY
Harry O. Ernsberger
ATTORNEY

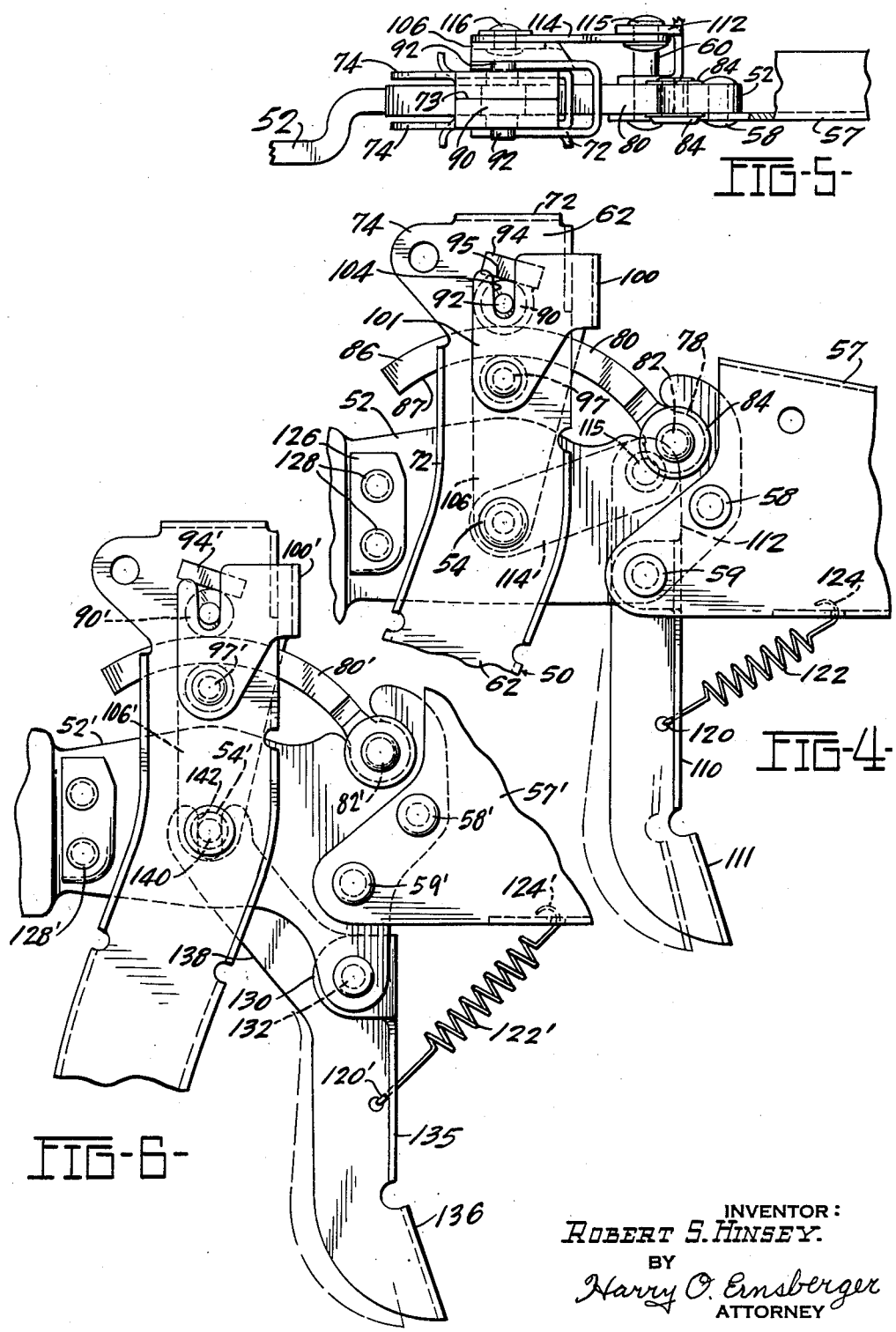

United States Patent Office 3,011,361
Patented Dec. 5, 1961

3,011,361
MECHANISM CONTROL
Robert S. Hinsey, Toledo, Ohio, assignor to The Bingham-Herbrand Corporation, Toledo, Ohio, a corporation of Ohio
Filed Dec. 16, 1957, Ser. No. 703,045
10 Claims. (Cl. 74—529)

This invention relates to mechanism control and more particularly to a mechanism or means for actuating or controlling the parking or emergency brakes of a vehicle.

The invention is inclusive of a foot-operated main lever or lever construction arranged to be connected with a vehicle parking brake mechanism and embodying a lever retaining means operable to hold the main lever or lever construction in an adjusted or brake-setting position in combination with means adapted to be foot-operated for releasing the lever retaining means.

An object of the invention resides in a foot-operated main lever arrangement embodying a lever retaining means for holding the lever arrangement in brake-setting or adjusted positions in combination with a supplemental lever articulately supported independently of the main lever arrangement and adapted to be foot-operated to effect a release of the main lever retaining means.

Another object of the invention is the provision of a foot-operated lever for actuating or controlling the parking brakes of a vehicle embodying friction means for retaining the lever in brake-setting positions in combination with a foot-operated released member supported independently of the brake operating lever and resiliently biased in a direction urging the lever retaining means into operative or lever retaining position.

Another object of the invention is the provision of a foot-operated lever construction in combination with means for retaining the lever construction in brake-setting or adjusted positions and embodying a foot-operated release means mounted independently of the brake operating lever and having connection with the lever retaining arrangement of such character that the movement of the brake actuating lever to any position does not affect the foot-operated release member which is operable at all times to release the brake actuating lever from any position of adjustment.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

FIGURE 1 is an elevational view of a portion of an operator's compartment of a vehicle, certain parts being broken away, illustrating a form of mechanism control of my invention installed in a vehicle;

FIGURE 2 is an enlarged vertical sectional view taken substantially on the line 2—2 of FIGURE 1;

FIGURE 3 is an enlarged vertical sectional view taken substantially on the line 3—3 of FIGURE 1;

FIGURE 4 is an elevational view on a larger scale showing a portion of the mechanism illustrated in FIGURE 1 particularly illustrating the brake actuating lever retaining means and the foot-operated release means;

FIGURE 5 is a top plan view of the arrangement illustrated in FIGURE 4, and

FIGURE 6 is an elevational view similar to FIGURE 4 illustrating a modified form of release means for the lever retaining means.

While the forms of control mechanism of the invention illustrated are particularly adapted for installation in an automotive vehicle and utilized for actuating or controlling the emergency or parking brakes of the vehicle, it is to be understood that the arrangements of the invention may be utilized for controlling or actuating other forms of mechanism wherever the same may be found to have utility.

Referring to the drawings in detail, FIGURES 1 through 5 inclusive illustrate one form of the invention. With reference to FIGURE 1, there is illustrated a portion of the operator's compartment of a vehicle in which the brake actuating means of the invention is mounted. The portion of the vehicle shown in FIGURE 1 is inclusive of a cowl section 10, a windshield 11, a dash board or fire wall 12, a toe board construction 14, an instrument panel 15, a conventional service brake actuating pedal or member 16, a steering post 18 and a steering wheel 19.

The chassis of the vehicle is inclusive of a frame construction which may include a pair of parallel side frame members 20 one of which is shown in FIGURE 1. Secured to the side frame members 20 are brackets 22, one of which is shown in FIGURE 1, the brackets journally supporting a transversely-extending shaft 24. Fixedly secured upon the shaft 24 is an arm 26 which is connected by means of a rod 27 with the parking brake mechanism arranged adjacent a pair of road wheels of the vehicle (not shown), the brake mechanism of this character being usually associated with the rear wheels of the vehicle.

The service brake pedal 16 may also be journaled upon the shaft 24 and arranged to actuate hydraulic brake-setting mechanism (not shown) connected to the service brake mechanism of the vehicle. Also fixedly secured upon the shaft 24 is an arm 30 provided at its distal end with a pin 32 which is adapted for traverse in a slot 33 formed in a link or member 34 as shown in FIGURE 1. An end of the link or member 34 is connected with a flexible cable 36 which is suitably enclosed or encased in a tubular sheath 37, the lower end region of which is secured to the frame member 20 by means of a clip 38.

One end of a contractile spring is connected with the link 34, the other end of the spring being anchored or secured to a pin 42 mounted on the chassis frame member 20. The spring 40, in conjunction with the brake return springs (not shown) associated with the brakes adjacent the wheels of the vehicle serve to normally bias the link 34 in a right-hand direction as viewed in FIGURE 1 toward brake release position.

The cable guiding sheath 37 extends through the fire wall or dash board 12 as shown in FIGURE 1, and the upper end of the actuating cable 36 is connected by means of a clevis 45 with a foot-operated, brake lever construction 50 for actuating the parking or emergency brakes of the vehicle.

The lever construction 50, a lever retaining means for holding the same in brake-setting or adjusted positions and a release mechanism therefor forms the mechanism control of the invention. Secured to the dash board or fire wall 12 or other portion of the vehicle is a lever supporting means including a support member 52 upon which the lever construction 50 is pivotally or articulately mounted as by means of a pivot or fulcrum pin or shaft 54. The upper end of the cable guiding sheath 37 extends through the dash board 12 and is secured in position by means of a clip 55 forming a part of the support member 52.

Additional reinforcement of the support 52 is provided by a sheet metal bracket 57 secured at one end to the support member 52 by means of rivets 58 and 59, the other end being secured to a flange formed on the instrument panel 15 by means of securing bolts 60. The brake operating lever or lever construction 50 includes similarly shaped mating sections 62 and 63 formed of sheet metal, the sections being formed with channel shaped portions, the inwardly extending flanges 64 of which are arranged in abutting relation as shown in FIGURE 3 and are welded together along the juncture line 66. The lower ends of the lever components 62 and 63 are provided with a metal foot pad portion 68 which may be covered with a pad or facing 70 of rubber or other suitable nonmetallic material.

It will be noted from FIGURE 3 that the components or sections 62 and 63 of the lever construction 50 are formed with aligned openings to receive the fulcrum pin 54 which extends through an opening in the support 52, the lever sections straddling the support. The lever sections 62 and 63 at the region adjacent the fulcrum 54 are formed with outwardly extending flanges 71 to reinforce the lever construction.

The upper regions of the lever sections 62 and 63 are formed with flanges 72 welded as at 73. The upper ends of sections 62 and 63 are formed with forwardly extending projections 74 provided with openings to receive a pin 75 for connecting the clevis 45 with the lever sections whereby clockwise rotation of the lever construction 50 as viewed in FIGURE 1 causes an upward movement of the cable 36 to effect a setting of the brake mechanism through the actuation of the brake rod 27. In this manner clockwise movement of the lever construction 50 about its fulcrum, as viewed in FIGURES 1 and 4, effects a setting of the vehicle parking or emergency brake mechanism.

The support 52 is formed with a circularly-shaped opening adapted to receive a circular end or head portion 78 formed at one end of a curved or arcuately shaped bar or arm 80 which forms a component of a means for retaining the lever construction 50 in adjusted or brake-setting positions. The walls defining the opening in the support which accommodates the circular head 78 are shaped to form a restricted throat as shown in FIGURE 4 preventing disengagement of the arm 80 from the support but permitting limited pivotal movement of the arm.

The central region of the head portion 78 is bored to accommodate a rivet 82 which extends through disks or washers 84 disposed at either side of the head 78 and overlapping the support in order to prevent lateral displacement of the arm 80 with respect to the support. The curved upper and lower surfaces 86 and 87 of the bar 80 are generated as arcs about the axis of the fulcrum or shaft 54 which pivotally supports the lever construction 50 on the support 52.

The lever retaining means is inclusive of a detent means or member 90 which, in the embodiment illustrated, is in the form of a roller. The roller 90 is formed with axially extending tenons or tenon portions 92. The roller 90 is adapted for cooperative engagement with the arcuate or clutching surface 86 of the bar 80. The regions of the lever sections 62 and 63 adjacent the detent roller 90 are formed with aligned openings to accommodate a transversely-extending, rectangularly-shaped block or member 94 disposed so that its lower surface 95 is angularly arranged with respect to the curvature 86 of the bar 80 so as to provide two generally converging surfaces 86 and 95 between which is disposed the clutch roller 90.

The surfaces 86 and 95 form a wedging angle to frictionally hold the detent member or roller 90 and hence the lever construction 50 in adjusted or brake-setting positions. The block 94 is preferably formed of hardened metal and may be welded to the lever sections 62 and 63 if desired. The lever sections 62 and 63 beneath the bar 80 are formed with transversely aligned openings to accommodate a rivet 97 upon which is journaled a circular cylindrically-shaped abutment or sleeve 98 forming a thrust member adapted for engagement with the lower arcuate surface 87 of the bar or arm 80 as shown in FIGURE 4.

The arrangement includes means for controlling the lever retaining or detent means for moving the detent roller toward lever retaining position and to effect a release of the clutch roller and the lever construction 50 for movement to brake release position. The detent control means includes a generally U-shaped member 100 formed of sheet metal with parallel leg portions 101 and 102, the leg portions having openings to accommodate the rivet 97 which extends through openings in sections 62 and 63 of the lever whereby the member 100 is supported upon the lever for pivotal movement about the axis of the rivet 97.

The wall portions 101 and 102 of the member 100 are formed with upwardly extending open-ended slots 104 which snugly, yet slidably and rotatably accommodate the tenons 92 formed on the clutch roller 90 in the manner illustrated in FIGURE 4. Thus pivotal movement of the U-shaped detent control member 100 about the axis of the rivet 97 determines the relative position of the clutch roller 90 with respect to the clutching surfaces 86 and 95 for rendering the detent effective or ineffective to retain the lever 50 in adjusted positions.

The detent control member 100 is formed with a depending arm 106 which extends in the region of the fulcrum 54 of the lever construction 50. Means is provided operable independently of the lever construction 50 for actuating the clutch control member 100. As particularly shown in FIGURE 4, a supplemental foot-operated lever 110 of generally U-shape in cross-section is pivotally supported upon the rivet 59 which extends through the bracket 57 and the support 52 whereby the supplemental or detent control lever 110 is pivotally mounted for movement about the axis of the rivet 60.

Means is provided for connecting or establishing operative connection between the supplemental lever 110 and the depending arm 106 of the clutch control member 100. As particularly illustrated in FIGURE 4, the supplemental lever 110 is provided with an upwardly extending portion or arm 112 and a foot pad 111 at its lower end. A link or connecting means 114 is joined to the arm 112 of the supplemental lever by means of a rivet 115, the opposite end of the link being joined to the depending arm 106 by means of a rivet 116.

It should be noted, as viewed in FIGURE 4, that the axis of the rivet 116 joining the link 114 with the detent control member 100 is normally substantially coincident or aligned with the axis of the fulcrum 54 of the lever 50 when the roller 90 is in engaging relation with the clutch surfaces 86 and 95 of the bar 80 and rectangular block 94 respectively. Thus, irrespective of the relative position to which the lever 50 may be moved in setting the brake mechanism, such movement will not affect the link 114 and the supplemental lever 110 by reason of the aligned relation of the axes of fulcrum 54 and the rivet 116.

Resilient means is provided for biasing the roller 90 into wedging engagement between the generally convergent surfaces 86 and 95. In the embodiment illustrated in FIGURES 1 through 5, the resilient means is associated with the supplemental lever 110, but it may be associated with the control member 100. As particularly shown in FIGURE 4, one end 120 of a contractile coil spring 122 is engaged or hooked through an opening in the supplemental lever 110 and the opposite end 124 of the spring is hooked into an opening formed in the bracket 57 which forms a part of the supporting means for the lever construction 50.

The contractile force of the spring 122 acts upon the supplemental or clutch release lever 110 normally biasing the supplemental lever about the axis of its pivot support 60 in a counterclockwise direction as viewed in FIGURE 4 urging or biasing the link 114 in a left-hand direction and urging the detent control member 100 in a clockwise direction about its pivotal support 97 to bias the detent roller into frictional wedging or locking engagement between the bar 80 and the block 94.

An abutment block 126 is secured to the support 52 by means of rivets 128 and is adapted to be engaged by one of the flanges 71 on the lever construction 50 when the latter is moved to brake release position in order to determine the initial position of the lever 50. The block 126 is preferably fashioned of semi-hard rubber or like material to cushion the impact or shock of the lever 50 when it is released and is rapidly returned toward brake release position under the influence of the spring 40 shown in FIGURE 1 and the brake shoe return springs (not shown) associated with the brakes adjacent the vehicle wheels.

In the operation of the arrangement shown in FIGURES 1 through 5, the operator desiring to set the emergency or parking brakes of a vehicle, exerts foot pressure upon the pad 70 at the lower end of the lever 50, swinging the lever about its fulcrum or pivot 54 in a clockwise direction as viewed in FIGURES 1 and 4. The contractile force of the spring 122 acting through the control member 100 causes the roller 90 to be moved with the lever to brake-setting position and is biased into locking engagement with the bar 80 and the block 95 by the pressure of the spring 122.

In this manner the brakes are retained in set position as the lever 50 is held in any adjusted position by the roller 90. When it is desired to release the parking or emergency brakes, the operator exerts foot pressure upon the pad 111 at the lower end of the supplemental or detent release lever 110 swinging the supplemental lever 110 about its pivot 60 in a clockwise direction which, through the medium of the link 114 and the arm 106, moves the detent control member 100 in a counterclockwise direction about its pivotal support 97.

As the tenons 92 on the roller 90 snugly fit between the walls defining the open-ended slots 104 in the member 100, the clutch roller is moved in a left-hand direction, as viewed in FIGURES 1 and 4, out of frictional or locking engagement with the bar 80 and the block 95 whereby the brake actuating or main lever 50 is swung in a counterclockwise direction about its fulcrum 54 to brake release position, the extreme limit of its movement in such direction being determined by the rubber abutment block 126.

Through this arrangement the supplemental or detent releasing lever 110 is normally maintained in a predetermined position irrespective of the relative position of the brake actuating lever 50. As the axis of the fulcrum 54 and the axis of the rivet 116, connecting link 114 with the arm 106, are normally in aligned relation, movement of the lever 50 to any adjusted or brake-setting position does not effect any relative movement of the link 114 and the supplemental or detent release lever 110. In the arrangement of the present invention, the parking or emergency brakes are moved to a set position and the brake-setting lever released solely by foot-operations.

FIGURE 6 is illustrative of a modified form of detent releasing lever and means connecting or establishing operative connection between the detent releasing lever and the control member. In the arrangement shown in FIGURE 6, the lever 50' and the detent control member 100' are substantially of the same construction as lever 50 and detent control member 100. The support 52' is equipped with a pivotally supported arm or bar 80' which cooperates with the detent or roller 90' and an abutment block 94' for securing the lever 50' in adjusted or brake-setting positions.

The support 52' is provided with a depending portion 130 and pivotally mounted upon a rivet 132 carried by the portion 130 is a supplemental lever 135 having a foot pad portion 136. The supplemental lever 135 for controlling the member 100' is adapted for pivotal movement about the axis of the rivet 132.

In this form of construction, the supplemental lever 135 is provided with a projecting portion or arm 138 which extends into a region adjacent the fulcrum 54' of the main lever 50'. The depending arm 106' formed as an integral part of the clutch control member 100' is provided with a pin or stub shaft 140, the axis of which is normally aligned with the axis of the fulcrum pin 54'. The upper region of the projection 138 formed on supplemental lever 135 is fashioned with a slot 142 the edge walls defining the slot being in snug engagement with the periphery of the pin 140 carried by the detent control arm 106'.

Thus the pin 140 and the slot 142 in the supplemental lever extension 138 provide or establish an operative connection or connecting means whereby movement of the supplemental lever 135 is transmitted to the detent control member 100' and the roller 90'. The roller 90' is biased toward wedging or frictional engagement between the bar 80' and the block 94' by means of the contractile coil spring 122'.

One end of the spring 120' is engaged in an opening in the lever 135 and the opposite end 124' of the spring is hooked through an opening in a flange formed on the bracket 57'. The contractile force of the spring 122' biases the detent releasing or supplemental lever 135 for movement in a counterclockwise direction about the axis of the rivet 132' and the detent control member 100' in a clockwise direction about its pivotal support 97' to normally resiliently urge the roller 90' into lever retaining or wedging position between the bar 80' and the block 94'.

The operation of the arrangement shown in FIGURE 6 is substantially the same as the operation of the arrangement shown in the form of the invention disclosed in FIGURES 1 through 5. The operator, desiring to set the parking brakes, actuates the main lever 50' by foot pressure applied to the foot pad at the end of the lever to swing the lever in a counterclockwise direction about its fulcrum 54' to set the brake mechanism. The force of the spring 122' is effective to cause the roller 90' to frictionally retain or hold the lever in brake-setting or adjusted positions.

When it is desired to release the brake actuating lever 50', the operator applies foot pressure to the pad 136 on the supplemental lever 135 swinging the same in a clockwise direction about its support or fulcrum 132 and, through the pin and slot connection 140, 142, the clutch control member 100' is swung in a counterclockwise direction about its support 97' to move the detent or roller 90' out of locking or wedging engagement between the bar 80' and the block 94' whereby the brake actuating lever 50' under the influence of the brake return springs is rapidly moved to brake release position.

As the operative connection between the lever 135 and the detent control member 100' is normally on an axis in alignment with the fulcrum 54' of the lever 50', the latter may be moved to any position of adjustment without affecting the release lever 135.

Hence it will be seen that in both forms of the invention, the detent release lever is mounted on a support for movement about a pivot or fulcrum spaced from and independent of the brake actuating lever and yet the brake release lever construction as well as the brake-setting lever are conveniently disposed for foot-operation.

It is apparent that, within the scope of the invention, modifications and different arrangements may be made other than is herein disclosed, and the present disclosure is illustrative merely, the invention comprehending all variations thereof.

I claim:

1. In a mechanism for controlling vehicle brakes, in combination, a support, a foot-operated main lever fulcrumed intermediate its ends on the support and adapted to be connected with the vehicle brakes, lever retaining means associated with said main lever for holding the main lever in adjusted positions, a supplemental foot-operated lever articulately mounted on the support at a region spaced from the main lever, an arm pivotally supported upon the main lever, a member establishing operative connection between the supplemental lever and said arm whereby the lever retaining means is controlled by the supplemental lever, and resilient means arranged to normally bias the lever retaining means toward lever retaining position.

2. In a device of the character disclosed for operating vehicle brakes, in combination, a support, a foot-operated main lever fulcrumed intermediate its ends on the support and adapted to be connected with the vehicle brakes, detent means associated with said main lever for retaining the main lever in adjusted positions, a supplemental foot-operated lever pivotally mounted on the support independently of the main lever, means including a member pivoted to the main lever establishing operative connection between said supplemental lever and said detent means for controlling the latter by the supplemental lever, and means arranged to normally bias the detent means toward lever retaining position.

3. In a device of the character disclosed for operating vehicle brakes, in combination, a support, a foot-operated main lever fulcrumed intermediate its ends on the support and adapted to be connected with the vehicle brakes, cooperative detent means associated with said main lever and the support for retaining the main lever in adjusted positions, a supplemental foot-operated lever articulately mounted on the support at a region spaced from the main lever, means including an arm pivotally supported on the main lever establishing operative connection between said supplemental lever and said detent means whereby said detent means is rendered effective or ineffective by movement of the supplemental lever, and spring means connected with the supplemental lever arranged to normally bias the detent means toward main lever retaining position.

4. Apparatus for controlling the parking brakes of a vehicle including, in combination, a support, a foot-operated main lever fulcrumed intermediate its ends upon the support and adapted to be connected with the brakes, releasable lever retaining means arranged between the main lever and the support for holding the main lever in brake-setting positions, a foot-operated supplemental lever mounted on the support for pivotal movement about an axis spaced from the main lever, a control member pivotally mounted on the main lever for the lever retaining means, resilient means normally biasing the main lever retaining means toward lever retaining position, and means associated with the supplemental lever establishing operative connection with the control member at a region whereby the lever retaining means may be released by relative movement of the supplemental lever irrespective of the position of the main lever.

5. Apparatus for controlling the parking brakes of a vehicle including, in combination, a support, a foot-operated main lever pivoted intermediate its ends upon the support and adapted to be connected with the parking brakes, releasable lever retaining means associated with the main lever and the support for holding the main lever in brake-setting positions, a foot-operated supplemental lever mounted on the support for pivotal movement about an axis spaced from the main lever, a control member pivotally supported upon the main lever for the lever retaining means, means associated with the supplemental lever engaging the control member at a region whereby the lever retaining means may be released by relative pivotal movement of the supplemental lever irrespective of the position of the main lever, and resilient means engaging the supplemental lever normally biasing the lever retaining means to main lever retaining position.

6. Apparatus for controlling the parking brakes of a vehicle including, in combination, a support, a foot-operated main lever fulcrumed intermediate its ends upon the support and adapted to be connected with the parking brakes, releasable lever retaining means arranged between the main lever and the support for holding the main lever in brake-setting positions, a foot-operated supplemental lever mounted on the support for pivotal movement about an axis spaced from the main lever, a control member for the lever retaining means pivotally supported upon the main lever, a link for establishing operative connection between the supplemental lever and the control member, and resilient means normally biasing the control member in a direction to render the lever retaining means effective to hold the main lever in brake-setting positions, said resilient means including a spring connected with said supplemental lever.

7. Apparatus for controlling the parking brakes of a vehicle including, in combination, a support, a foot-operated main lever pivotally mounted intermediate its ends upon the support and adapted to be connected with the parking brakes, releasable lever retaining means arranged between the main lever and the support for holding the main lever in brake-setting positions, a foot-operated supplemental lever mounted on the support for pivotal movement at a region spaced from the main lever, a control member for the lever retaining means pivotally supported upon the main lever, a link for establishing operative connection between the supplemental lever and the control member, and resilient means biasing the control member in a direction to render the lever retaining means effective to hold the main lever in brake-setting position, said resilient means comprising a spring connected with said supplemental lever and the support.

8. Mechanism for controlling braking means of a vehicle, in combination, a support, a foot-operated main lever fulcrumed intermediate its ends upon the support and adapted to be connected with the vehicle braking means, said lever being formed with an abutment surface, an arcuately shaped element associated with the support, a roller disposed between and arranged for frictional engagement with the abutment surface and said element for retaining the main lever in brake-setting positions, a control member articulately supported upon the main lever for moving the roller into effective or ineffective positions, a foot-operated supplemental lever mounted on the support for pivotal movement about an axis spaced from the main lever, means for establishing an operative connection between the supplemental lever and the control member whereby the control member may be actuated by the supplemental lever to release said roller irrespective of the position of the main lever, and resilient means connected with the supplemental lever for normally biasing the roller into lever retaining engagement with the abutment surface and the arcuately shaped element.

9. Mechanism for controlling braking means of a vehicle, in combination, a support, a foot-operated main lever fulcrumed intermediate its ends upon the support and adapted to be connected with the vehicle braking means, said lever being formed with an abutment surface, an arcuately shaped surface associated with the support, means disposed between and arranged for engagement with the abutment and arcuately shaped surfaces for retaining the main lever in brake-setting positions, a control member carried by the main lever for moving the lever retaining means into effective or ineffective positions, a foot-operated supplemental lever mounted on the support independently of the main lever, means for establishing operative connection between the supplemental lever and the control member whereby the control member may be actuated by the supplemental lever to release said lever retaining means irrespective of the position of the main lever, and resilient means for normally biasing the lever retaining means into lever retaining engagement with the said surfaces.

10. Apparatus for actuating parking brakes of a vehicle, in combination, a support, a foot-operated main lever fulcrumed intermediate its ends on the support and adapted to be connected with the vehicle brakes, cooperating components for retaining said main lever in brake setting positions, one of said components being carried by the main lever and another component associated with the support, a foot-operated supplemental lever fulcrumed upon a pivot carried by the support and spaced from said main lever, an arm pivotally supported upon the main lever and connected with the component of the lever retaining means carried by the main lever, said arm having operative connection with the supplemental lever whereby movement of the supplemental lever effects a release of the main lever from brake setting position, and spring means connected with the support and the supplemental lever normally biasing the component carried by the main lever into operative engagement with the other of said components.

References Cited in the file of this patent

UNITED STATES PATENTS

| | | |
|---|---|---|
| 1,696,702 | Watlington | Dec. 25, 1928 |
| 2,014,300 | Strobridge | Sept. 10, 1935 |
| 2,315,704 | Hoch | Apr. 6, 1943 |
| 2,587,725 | Hinsey | Mar. 4, 1952 |
| 2,872,830 | Hinsey | Feb. 10, 1959 |
| 2,875,641 | Powell | Mar. 3, 1959 |
| 2,881,637 | Hinsey | Apr. 14, 1959 |
| 2,935,895 | Krause | May 10, 1960 |

FOREIGN PATENTS

| | | |
|---|---|---|
| 694,306 | France | Sept. 15, 1930 |